Feb. 2, 1960 W. O. GRUBE 2,923,213
PHOTOTYPOGRAPHICAL MACHINE
Filed Nov. 14, 1957 5 Sheets-Sheet 1

INVENTOR.
WOLFGANG O. GRUBE
BY
ATTORNEYS

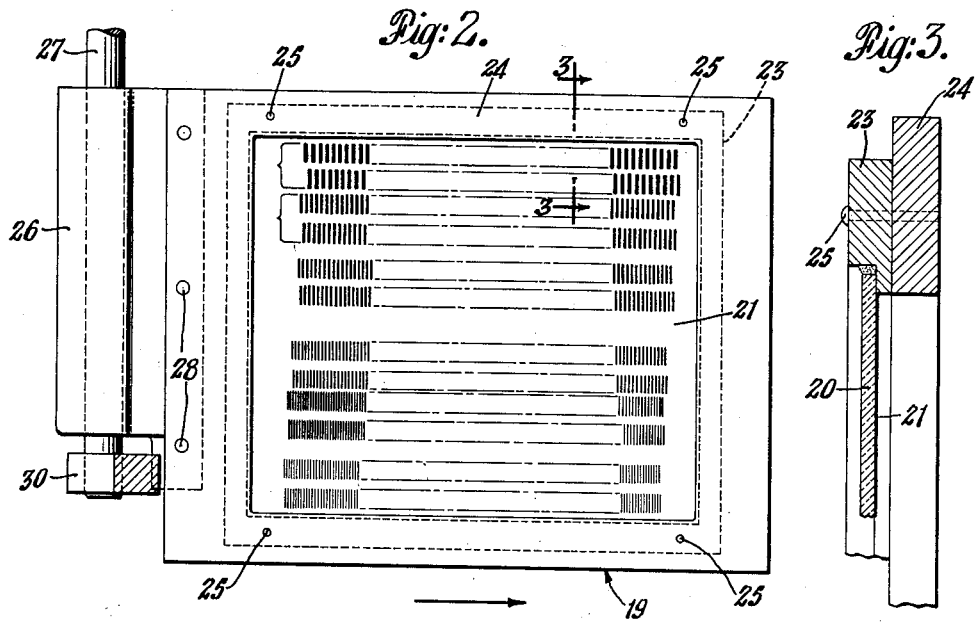
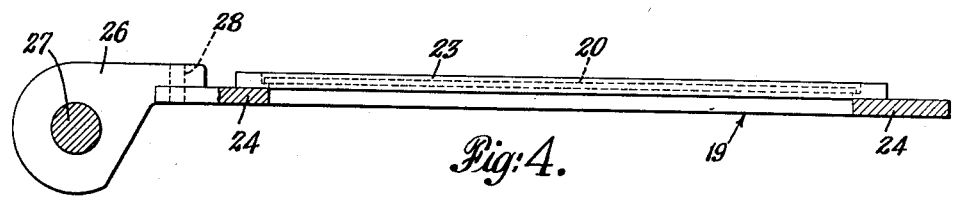
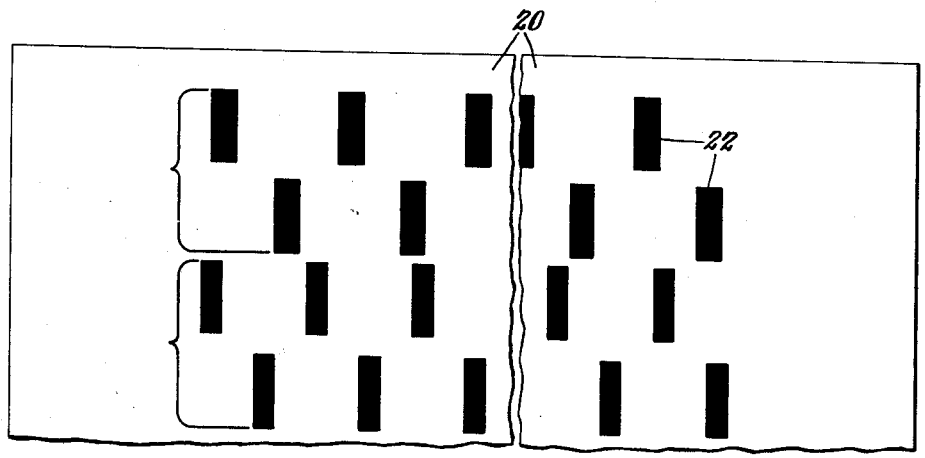

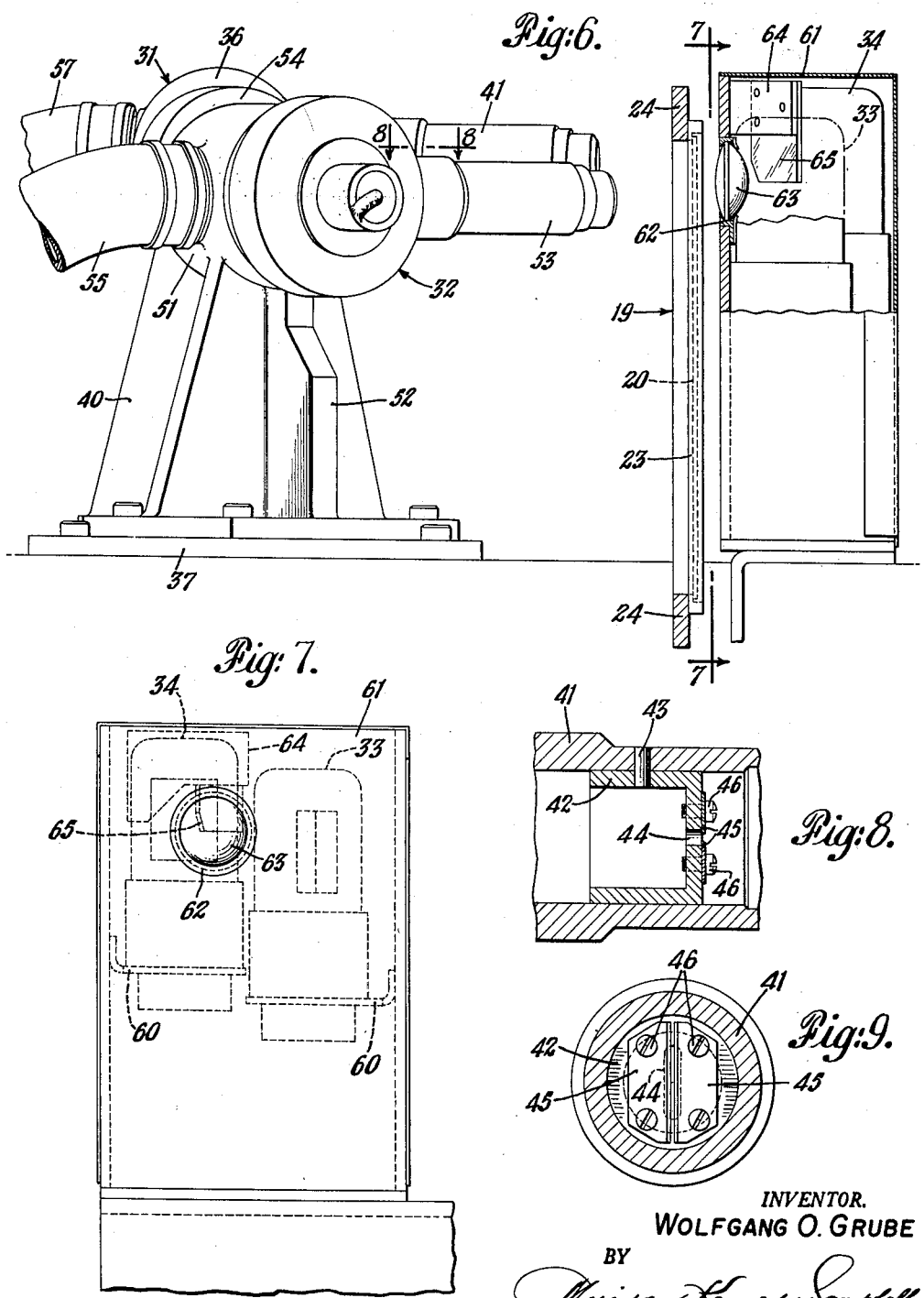

INVENTOR.
WOLFGANG O. GRUBE

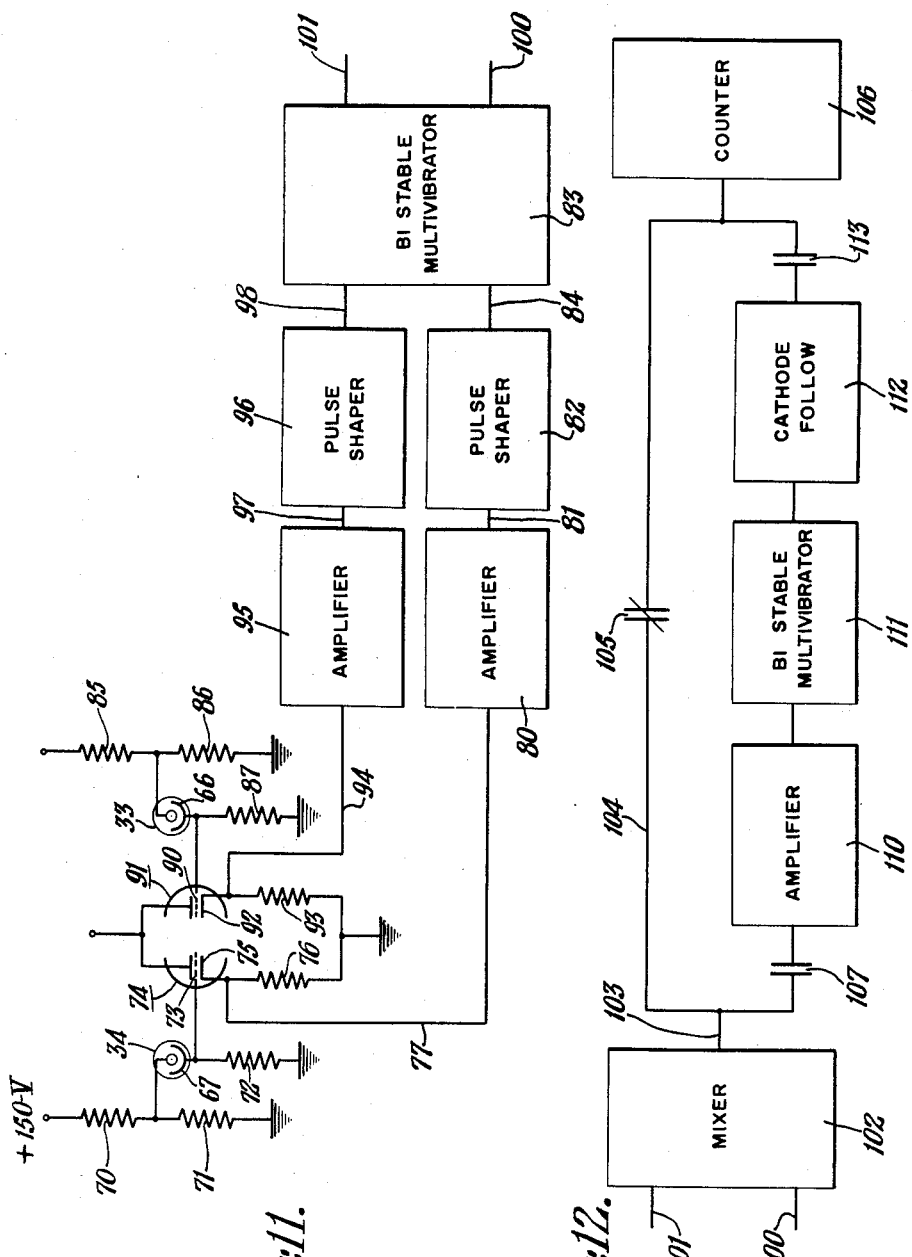

United States Patent Office 2,923,213
Patented Feb. 2, 1960

2,923,213
PHOTOTYPOGRAPHICAL MACHINE

Wolfgang O. Grube, Leonia, N.J., assignor to Mergenthaler Linotype Company, a corporation of New York Application November 14, 1957, Serial No. 696,419

6 Claims. (Cl. 95—4.5)

This invention relates to a phototypographical machine and particularly to a tape operated machine of the general organization disclosed in U.S. applications for Letters Patent Serial No. 419,012, filed March 26, 1954 and Serial No. 432,757, filed May 27, 1954, wherein characters are photographed one after another on a strip of sensitized film or paper for line composition as a relative movement takes place between the sensitized film or paper and the position to which character images are projected.

In a machine of the type therein disclosed, a font plate having an array of transparent characters which vary in set widths on a unit basis is interposed between a source of light and a shutter mechanism which serves to selectively expose the various characters. In operation, the shutter mechanism is actuated to expose a character selected to be photographed and the light source is then rendered operative to project light through the character to a lenslet individual to the character. The lenslet forms the light which passes therethrough into a bundle of collimated rays and these impinge on an imaging lens common to all the lenslets. The imaging lens, in turn, serves to form, in space and on its optical axis, an image of the selected character. A point size changing lens system is provided comprising two eye piece lenses whose combined function is to vary the size or magnification of the selected character as it is finally recorded on the sensitized film or paper. The eye piece lenses also serve to transmit the light forming the image in space as a bundle of collimated light rays to a mirror carried by a carriage that continuously traverses the sensitized film during the composition of a line, the film remaining stationary during composition. The mirror deflects the bundle of light rays at an angle of 90° and directs it to a further lens system which is also mounted on the moving carriage and which serves to decollimate the light rays and project them onto the stationary light sensitive film to form an image of the selected character in a point size controlled by the setting of the eye piece lenses.

The operation of the machine is controlled by means of a coded tape. Each character to be photographed is represented on the tape by a code signal which may be thought of as comprising two portions, one of which identifies the character and controls the operation of the shutter mechanism to selectively expose the character to be photographed, and the other portion of which represents the unit set width of the character and is transmitted to an electronic counter. An opaque grating, having a row of translucent slits spaced apart in units of an em of the point size of the photographed characters, is secured to the carriage for movement therewith and traverses a light beam extending from a light source to a photocell in such a manner as to transmit the light beam to the photocell for each unit of an em travelled by the carriage. The resulting pulses from the photocell are transmitted to the electronic counter. When the number of pulses from the photocell correspond with the numerical value of the unit width of the character transmitted to the counter by the code signal on the tape, the counter generates an output pulse which momentarily flashes the source of light behind the font plate to thus photograph the selected character onto the light sensitive film.

Furthermore, in copending application Serial No. 624,136, filed November 23, 1956, mechanism is disclosed whereby point size signals that are provided in the coded control tape can be decoded to control the adjustment of the point size changing lenses and the projection lens carriage grating so that photography of selected characters can be accomplished in various point sizes automatically in response to the coded control tape. Consequently, the machine must be inherently capable of photographing characters and forming images thereof on film in a full range of point sizes in order to increase the versatility of the machine.

However, as the range of point sizes increases, then the grating which is used to measure the amount of carriage movement in units of an em of the point size of the recorded images must increase in area in order to accommodate the various rows of translucent slits. In fact, in a machine built by the assignee of the aforementioned applications, line composition in twelve different point sizes can be accomplished automatically in response to the coded control tape. As the area of the glass plate of the grating increases, the flatness tolerances of the surface also increase or the grating becomes inordinately expensive. Notwithstanding, close tolerances must be maintained in order to meet the demands of fine typography, for otherwise the ripples that might be formed on the surface of the grating might cause a character to be imaged one thousandth (0.001) of an inch or more from its proper position. Therefore, every effort is made to reduce the area of the grating without unduly limiting the versatility of the machine.

In carrying out the present invention, there is provided a grating in which a plurality of series of translucent slits are provided, in each of which series the spacing between adjacent slits is based on the point size of the typographical em for which the series is provided. For example, different series are provided for the following point sizes: 5, 5½, 6, 7, 8 and 9 points. Inasmuch as a 5 point em is one half the dimensions of a 10 point em, the series of slits provided for photographing 5 point character images can also be used for photographing 10 point character images, provided that every second slit rather than every single slit is counted. The same is true for the 5½, 6, 7, 8 and 9 point series of slits, each of which series can also be used for photographing character images of twice the point size, provided only that every second slit is counted. Accordingly, circuit means are provided whereby either every successive slit, or every other slit, can be counted depending on the point size of the character images being photographed.

Features and advantages of this invention can be gained from the foregoing and the description of a preferred embodiment thereof which follows:

In the drawings:

Fig. 2 is a front elevational view of the grating;

Fig. 3 is an enlarged sectional view taken along line 3—3 of Fig. 2;

Fig. 4 is a top plan (edge) view of the grating;

Fig. 5 is an enlarged fragmental view showing the translucent slit arrangement of the grating;

Fig. 6 is a side elevational view, partly in section, showing the relationship of the grating to the photocell unit;

Fig. 7 is a view taken along line 7—7 of Fig. 6;

Fig. 8 is a fragmental sectional view taken along line 8—8 of Fig. 6;

Fig 9 is an elevational view looking into the light source tube and showing the means for forming the light beam into a narrow band;

Figs. 11 and 12 are schematic block diagrams showing the circuitry for the present invention.

Figure 1:
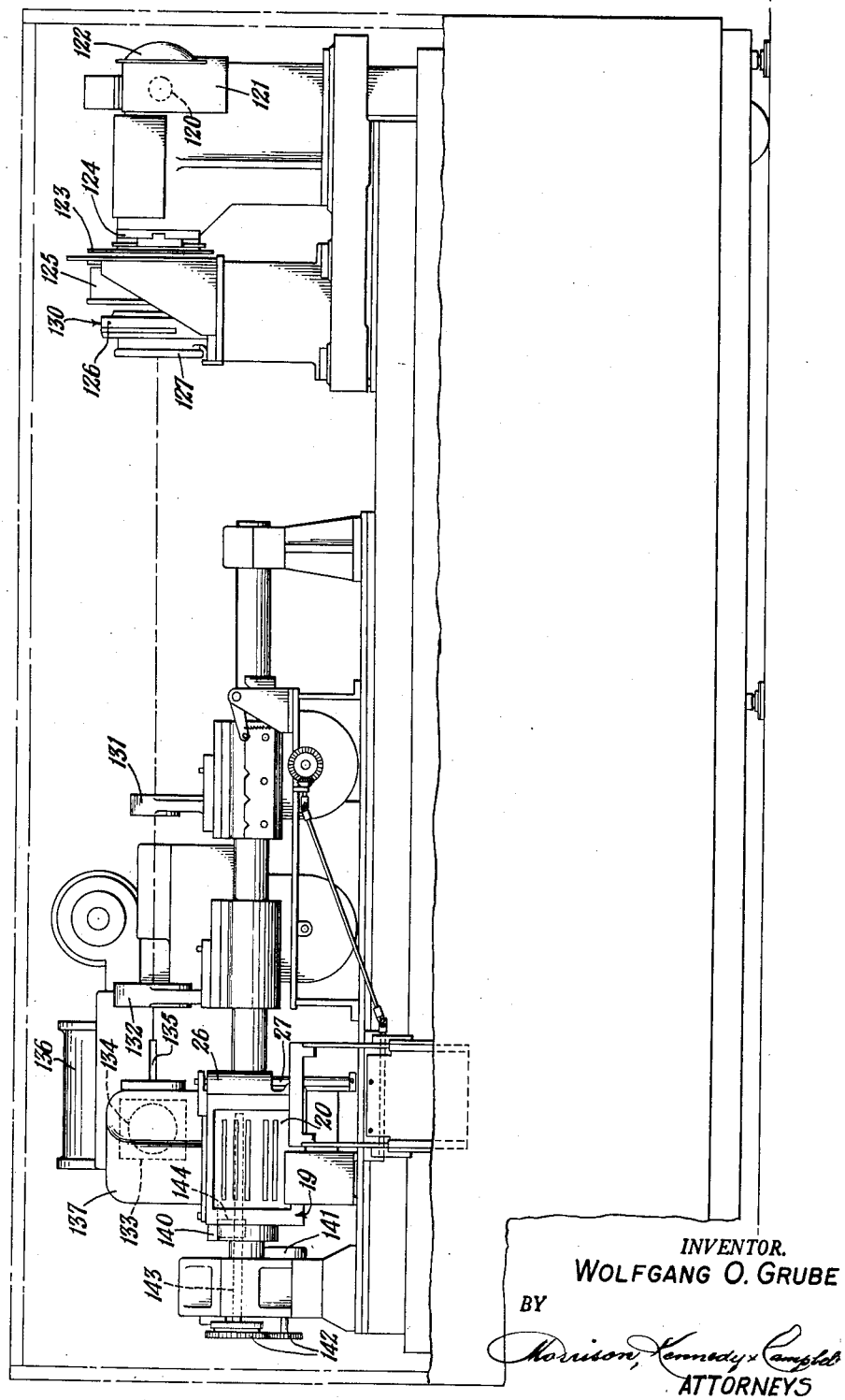
Fig. 1 is a front elevational view of a photocomposing machine embodying a grating according to the present invention.

In Fig. 1 there is shown a photocomposing machine similar to the one disclosed in the aforementioned application Serial No. 419,012 but more specifically embodying the improvements of the present invention. A source of light 120 is shown mounted within housing 121, as is reflector 122 which serves to concentrate and intensify the light energy in a direction forward of the source. The light is then distributed relatively evenly over the area of a font plate 123 by a condensing lens system 124, the font plate having an entire array of transparent characters arranged thereon against an opaque background. The set widths of the several characters vary one from another on a units-of-an-em basis. That is, the typographical em is divided into a finite number of equal parts or units and each character is assigned a width of so many units. The present system is based on an eighteen unit em, although it could have been based on an em comprising more or or less units depending on the degree of typographic refinement desired. An eighteen unit system has been found to be entirely satisfactory.

A shutter mechanism 125 is next provided whereby the light passing through a single character selected for reproduction will be transmitted to succeeding machine components. Located forward of the shutter mechanism, within housing 130, is a lenslet array 126 which includes an individual lenslet for each character of the font. The lenslets and the font plate are disposed relative to each other such that light passing through a selected character is collimated by the associated lenslet. A single imaging lens 127, common to all of the lenslets of array 126, is provided within the housing 130, the lens 127 serving to form an image, in space and on its optical axis, of a selected character. The position of the image along the optical axis is determined by the location of an eyepiece objective lens 131. The light transmitted through the lens 131 is next collimated by a second eyepiece lens 132 and thereafter reflected by mirror 133 to a projection lens system 134 which reimages the character on a sensitized film 135 provided in film magazine 136. The mirror 133 and lens system 134 are located within a housing 137 supported by a carriage 140 which is mounted for reciprocatory motion before the sensitized film to effect the character by character composition of a line.

In a machine as herein contemplated, the carriage is driven continuously by a reversible motor 141, the drive mechanism being the spur gear unit 142 and lead screw 143 which is threaded into the follower block 144 secured to the underside of the carriage. Since the carriage traverses the stationary film continuously (rather than in intermittent steps of a degree depending on the width of the photographed characters), there is provided means for determining at which point of carriage travel a character is to be photographed. Such means include the point size grating or grid plate 19 which depends from one side of the carriage so as to be translated therewith. The grating, which cooperates with a stationary photocell unit in a manner hereinafter to be described, itself includes a plurality of series of translucent slits equally spaced on an opaque background. The leading edge, considering the direction of travel of the grid plate, of each slit in a selected series is spaced from the corresponding point of the preceding slit by a distance equal to a unit-of-an-em of the point size for which the series is provided. Each series of slits corresponds to a particular point size which can be reproduced in the machine. Thus by way of example, the six series of slits illustrated represent the point sizes 5, 5½, 6, 7, 8 and 9 reading from bottom to top, respectively. For a means to bring a selected row of slits into cooperative relation with the photocell unit, see the aforementioned copending application Serial No. 624,136. In operation, as the grating traverses the light beam of the photocell unit, the photocell is energized or pulsed by a beam of light for each unit of an em travelled by the grid plate and hence the carriage.

The point size grating 19, mounted on the projection lens carriage, is shown more in detail in Fig. 2. The grating includes a translucent glass plate 20 with an emulsion coating 21 adhered thereto. In the final form in which the grating finds utility, the emulsion coating has an opaque background with a plurality of series of successively acting translucent slits 22, each series being arranged in two rows and spaced apart such that the leading edge of each slit in each row is two units-of-an-em of the point size for which the series is provided from the corresponding position of the next adjacent slit in the same row. The two juxtaposed rows (shown bracketed in Fig. 5) are operatively associated one with the other, as will be seen more clearly hereinafter. Suffice it to say that, in the associated rows of each pair, the disposition of the slits is identical. However, the slits in one of the rows are displaced longitudinally so that the leading edge of each slit, while spaced two units of an em from the corresponding position of an adjacent slit in the same row, is spaced one unit of an em from the corresponding position of nearest slit in the associated row. Therefore, if one considers a pair of light beams traversing the pair of rows of slits, one beam scanning one row and the second beam scanning the other row, one or the other light beam will be flashed for each unit-of-an-em relative movement between the grating and the light beams. Of course, the light beams will be flashed alternately. For the sake of clarity, the transparent slits are shown as though they were opaque and the back ground as if it were transparent.

It will be appreciated that the spacing between adjacent slits in each pair of associated rows will be dependent on the point size of the reproduced character images for which the rows are provided and, consequently, the spacing of the slits for the smaller point sizes will be less than that for the larger point sizes. It will be observed that the first slit in the row for a smaller point size is offset from a vertical line projected through the first slit of a larger point size. This attribute, which is more fully disclosed in copending application Serial No. 432,757 filed May 27, 1954, insures that a constant or even left hand margin is obtained regardless of the point size of the reproduced character images.

The glass plate 20 is secured within a first frame 23 by cementing the plate in the shoulder provided, while the frame 23 is, in turn, secured to frame 24 as by screws 25. An elongated collar 26, which is slidably disposed on the guide rod 27, is fastened to frame 24 by pins 28. By this structure, the grating may be positioned vertically to bring any pair of associated rows of slits into operative alignment with a photocell unit, as disclosed in aforementioned application Serial No. 624,136. A stop member 30, secured to the lower end of guide rod 27, prevents the grating assembly from being inadvertently disassociated from the guide rod.

Figure 10:
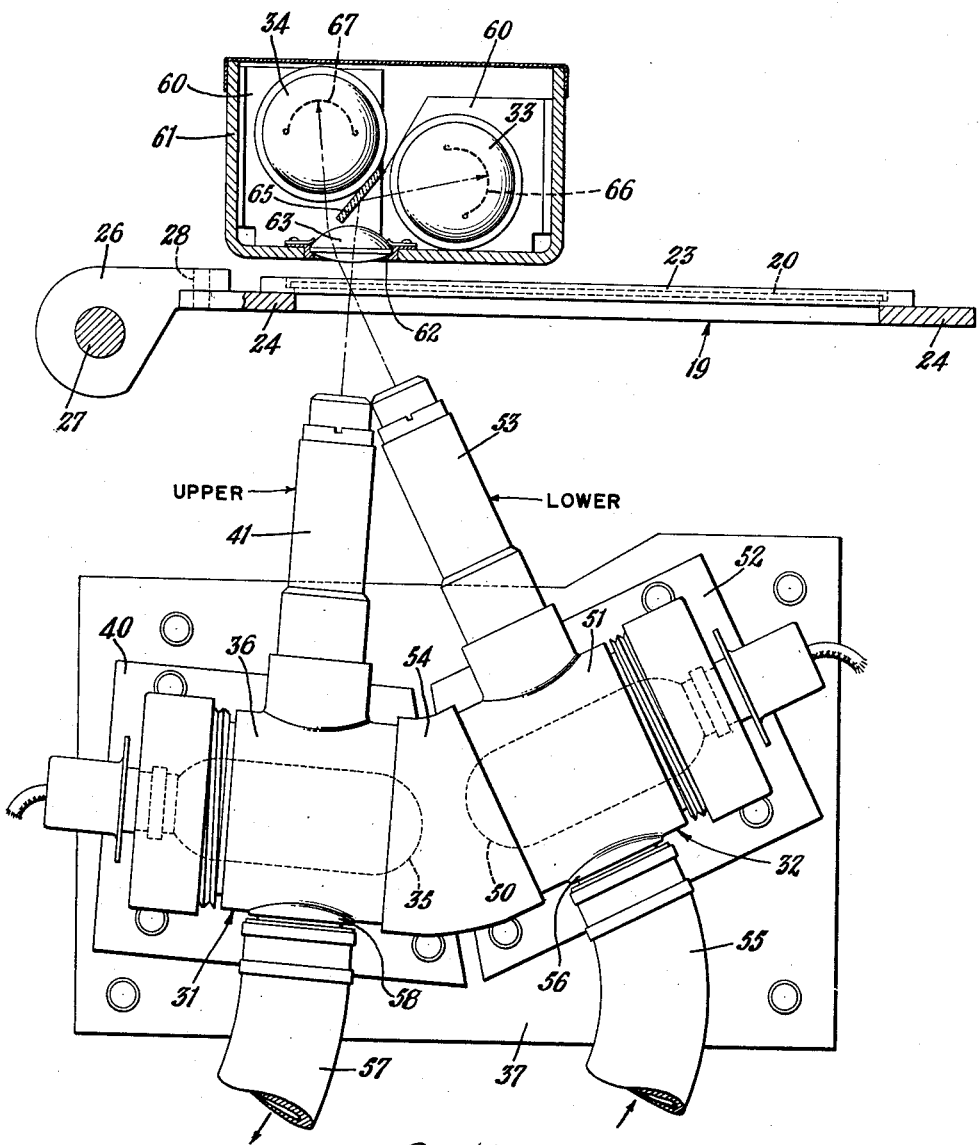
Fig. 10 is a top plan view showing the relationship of the grating to the photocell unit.

Referring to Figs. 6 and 10, it is seen that the grating is interposed between a pair of light sources 31 and 32 and a photocell unit comprising a pair of photo-electric tubes 33 and 34. The first light source includes a lamp 35 mounted in a housing 36 which is supported above the machine bed plate 37 by a bracket 40. Projecting from housing 36 is a tubular member 41 in which is mounted a simple lens system (not shown) which converges the light beams emitted by lamp 35 so that they may be focused on the photo-electric tube cathode. A cylindrical cup-shaped member 42 (Fig. 8), secured within the tubular member by pin 43, is provided with an elongated aperture 44. A pair of plates 45 (Fig. 9) are secured by screws 46 to the transverse portion of member 42 so that they may be adjusted toward or away from each other to provide a narrow slit through which the light beam passes. It will be observed that the adjacent edges of the plates are provided with knife-like edges to minimize dispersion of the light beam.

The second light source 32 similarly includes a lamp 50 mounted in a housing 51 which is supported above the machine bed plate by a bracket 52. A tubular member 53, projecting from the housing, contains a simple lens system which converges the light beam emitted by lamp 50. This latter tubular member also has mounted therein a cup-shaped member having an elongated aperture similar to that provided in member 41 and shown in Figs. 7 and 8, whereby the width of the light beam can be controlled.

The two housings 36 and 51 are joined together by a connecting piece 54 so that a single chamber, in effect, is obtained. A hose 55 is connected to an inlet port 56 formed in housing 51, while a second hose 57 is connected to the outlet port 58 formed in housing 36. A current of air is circulated through hose 55 into the connected housings, over the lamps, and out through hose 57. In this manner the heat produced by the two lamps is carried away from the mechanism and overheating of the housings and lamps is prevented.

It will be noted that the arrangement of parts is such that the light beam from source 32 will intersect the grating at a higher point than that at which the light beam from source 31 intersects the grating, thereby assuring that one light beam will intersect one row of slits while the second light beam will intersect the other row of slits in an associated pair of rows. Furthermore, the beams of light both intersect the emulsion surface of the grating along a precise vertical line (see Fig. 10). This has been found extremely desirable in order to provide an accurate measurement of carriage travel.

Turning now to a consideration of the photocell unit, this is seen to be simply a pair of photo-electric tubes 33 and 34 supported on a pair of angle brackets 60 within box 61. The face of the box is provided with an opening 62 in which is mounted a lens 63. From the top of the box a bracket 64 supports the angularly disposed depending mirror 65. The mirror, in conjunction with lens 63, directs the light beam from source 31 to the cathode 66 of photo-electric tube 33. The light beam from source 32 is refracted by lens 63 to energize the cathode 67 of photo-electric tube 34.

It is believed apparent from the foregoing description, particularly of the alternate arrangement of slits in an associated pair of rows, that, as the carriage and the grating carried thereby traverses the light beams from the pair of light sources, the photo-electric tubes will be alternately energized and, considering the pair of photoelectric tubes as a unit, that a photo-electric tube will be energized for each unit of an em travelled by the projection lens carriage and grating.

Referring now to Fig. 11, the photocells 33 and 34, which have heretofore been shown in mechanical detail, are now illustrated in the pulse generating circuit for which they are provided.

The photocell 34 is connected in a potentiometer circuit comprising resistors 70, 71 and 72 which are connected to a 150 volt power supply and ground as shown. The junction between the photocell cathode 67 and grid resistor 72 is connected to the grid 73 of tube 74, the tube normally being in an extinguished or nonconducting condition. However, when photocell tube 34 begins to conduct current, as when the cathode thereof is illuminated by the light source 32 as a slit on the grating, as distinguished from the opaque background of the grating, is interposed between the light source 32 and the photocell tube 34, a voltage is imposed on grid 73 causing tube 74 to fire and conduct current. Thereafter when the slit is completely traversed, the photocell tube ceases to conduct and tube 74 is extinguished. When tube 74 first conducts and then is extinguished, the voltage at cathode 75 rises from its quiescent value to a higher voltage and thereafter falls to its quiescent value and, therefore, a positive voltage pulse is generated across cathode resistor 76, which pulse is transmitted over conductor 77. The pulse is then amplified in amplifier 80 and a positive pulse output is transmitted over conductor 81 to the next circuit stage, namely, to pulse shaper 82, which merely provides a pulse of the proper waveform for operation of the pulse circuitry. The pulse, which is still a positive voltage pulse, is next transmitted to the bi-stable multivibrator 83 over the conductor 84 leading to the first stage of the multivibrator.

The pulse generating circuit has been considered, up to this point, as operable solely by photocell tube 34. We will next consider the second photocell tube 33 and trace the pulses generated thereby.

The second photocell tube 33 is connected to a potentiometer circuit comprising resistors 85, 86 and 87 similar to the one previously discussed. When the photocell tube is energized, as by a slit in the grating traversing the light beam from source 31, a voltage is applied to grid 90 of tube 91, thereby causing the tube to conduct. As further carriage travel carries the grating so that the slit is moved out the light beam and the opaque background of the grating interrupts the beam to deenergize the photocell tube, the voltage which was applied to grid 90 is removed and tube 91 is extinguished. Consequently, the voltage at cathode 92 was first raised and restored to its normal value, thereby resulting in a positive pulse generated across cathode resistor 93 and transmitted over conductor 94. The pulse is amplified in amplifier 95 and then transmitted to the pulse shaper 96 over conductor 97, after which it is transmitted to the second stage of the bi-stable multivibrator 83 over conductor 98.

Because of the staggered arrangement of slits in the pair of associated rows (Fig. 5), the pulses generated by the two photocells follow one another alternately from each photocell. The pulses generated by one photocell tube e.g. 34, trigger the bi-stable multivibrator so that, for example, the first tube therein produces an output pulse, whereas the pulses generated by the other photocell tube i.e. 33, trigger the multivibrator so that the second tube therein produces an output pulse. Inasmuch as the pulses generated alternately by the two photocell tubes are transmitted to the two inputs to a bi-stable multivibrator, it is clear that if two pulses in succession or a series of pulses are transmitted to one input to the multivibrator, without the interposition of a pulse to the second multivibrator input, only the first such pulse is counted. It is the multivibrator, however, which insures that the generated pulses come alternately from the two photocell tubes. This feature has been found extremely desirable particularly under the circumstances previously outlined, but repeated here for the sake of clarity. If we consider interruption of the carriage motion during the photographing of a line of characters, as when such motion is arrested to permit changing the character font, and consequently change the type face of the characters thereafter photographed, it has been discovered that the carriage vibrates very slightly in a direction parallel to the guide rod supporting the carriage and along which the carriage travels. Assume that the relative position of the grating and the photocell unit when these vibrations occur is such that the light beam itself is repeatedly interrupted by the opaque background of the grating and transmitted by the slit, as would occur if the arresting action takes place when the boundary between a grating slit and the opaque background is proximate to the light beam. With the mechanism provided and disclosed above, the repeated pulsing of the photocell tube will not result in a false count being transmitted to the counter, since only the first such pulse will be counted. Succeeding pulses from the same photocell tube will be blocked out by the bistable multivibrator 83 which demands that pulses be introduced alternately from the two photocell tubes. If, contrasted to the mechanism disclosed, a single photocell tube is provided for cooperation with a single row of grating slits, then under the conditions outlined, the repeated pulsing of the photocell, when the carriage is being brought to a stop and vibrates at the boundary between a slit and the grating background, will introduce a false count to the counting device. As was hereinabove mentioned, the count controls the photographing of the individual characters, so it will be appreciated that a false count will result in an improperly photographed line.

Again picking up the paths that the pulses follow, the diagram (Fig. 12) shows that the output pulses from multivibrator 83 are transmitted over conductors 100 and 101 to the mixer circuit 102 which combines the two independent pulses trains into a single pulse train, the pulses of which are transmitted as positive pulses to conductor 103. From conductor 103, the pulses may travel over conductor 104 through normally engaged contacts 105 to the counter 106. When the pulses travel over this circuit each pulse will be counted. An alternative circuit path is from conductor 103 through normally separated contacts 107, amplifier 110, bi-stable multi-vibrator 111, cathode follower 112 and normally separated contacts 113, to counter 106. The contacts 105, 107 and 113 are actuated by the same relay coil (not shown) so that the pulses are transmitted from conductor 103 through either one of the two circuits disclosed.

The functioning of the relay coil to control operation of contacts is controlled in accordance with the point size of the character images being recorded on the sensitized sheet. Thus for small point sizes, e.g. 5, 5½, 6, 7, 8 and 9 points, the relay coil will remain deenergized so that contacts 105 stay in their normally engaged condition, while contacts 107 and 113 are separated. Therefore, all pulses generated by the photocell unit will be transmitted to the counter. On the other hand, when large point size images are being recorded, e.g. those of 10, 11, 12, 14, 16 and 18 points, the relay coil will be energized and contacts 107 and 113 will be engaged and contacts 105 separated. In this instance, the pulses will be transmitted through amplifier 110, bi-stable multivibrator 111 and cathode follower 112 to counter 106. For every two pulses transmitted to multivibrator 111, only one pulse will be transmitted to the cathode follower and from it to the counter. This latter group of circuits is thus seen to be a dividing circuit wherein the divisor is two.

The utility of the foregoing arrangement is apparent when one considers that the linear dimensions of the typographical em of different point sizes are proportional to the point sizes. Thus the width of a 10 point em is twice the width of a 5 point em and a unit of a 10 point em is twice the dimension of a unit of a 5 point em. Therefore, if a grating is prepared and the slit disposition is such that a pulse is generated for each unit of a 5 point em traversed by the grating, the exact pulse count will measure the travel of the grating in terms of 5 points ems. However, if as in the circuit hereinabove described, every second pulse generated by the grating is counted, then the same row of slits as is provided when recording 5 point character images may be used when recording 10 point character images. As a further example, if a slit arrangement is such that a pulse is generated for every unit of a 5½ point em, then by counting every second pulse, the same slit arrangement can be used for an 11 point em.

In the embodiment disclosed, the grating is provided with slit arrangements for measuring grating (i.e. carriage) travel in units of a five and a ten point em, a 5½ and an 11 point em, a 6 and a 12 point em, a 7 and a 14 point em, an 8 and 16 point em, and a 9 and an 18 point em. Thus, the machine can record character images of 12 different point sizes and yet it is required that the grating be provided as if it were to be used only for 6 different point sizes. Of course, other combinations of point sizes may be used.

One of the chief advantages of such a feature is that the size (area-wise, that is) of the grating can be reduced approximately to one-half of the size that would be required should a separate row, or pair of rows, of slits be provided for each point size. This permits flatness tolerances which are imposed on the grating surface to be more readily achieved.

A further examination of Fig. 2 will reveal that the first slit in a pair of rows is offset from the corresponding slit in another pair of rows, and that those for the larger point sizes are offset the farthest when considering the rightward edge of the grating as a reference. The reason for the offset is found in the arrangement of the characters on the font plate and the relative location of the font plate and the machine optical system. In copending application Serial No. 432,757 filed May 27, 1954, the font plate is disclosed as having a plurality of em squares disposed thereon, in each of which the particular character found therein, is located by two reference lines, one to vertically locate the character and the other to horizontally locate the character as by coinciding with the leading or rightmost edge of the character. The optical system is such (see copending application Serial No. 354,826 filed May 11, 1953) and the font plate is so located with respect thereto that the optical center of the system passes through the midpoint of each em square. The degree offset for the various rows of slits on the grating is equal to one-half the difference in the width of the em squares for the two point sizes for which the rows are provided. For example, if we consider the rows of slits for 6 point and 8 point images, the row for 8 points will be offset $$\frac{8-6}{2} \text{ or } 1 \text{ point}$$

As a further example, if we consider the 8 and 9 point rows, the 9 point row will be offset $$\frac{9-8}{2} \text{ or } \frac{1}{2} \text{ point}$$

from the 8 point row and the 9 point row will be offset 1½ points from the 6 point row. The purpose of the offset is to insure that the left hand margin of a column will be maintained regardless of the point size images which may be recorded in the lines of the column.

From the foregoing disclosure it is clear that the row of slits for 6 points will be offset from the row of slits for 12 points. But, it will be recalled that the present machine utilizes the same row of slits for both 6 and 12 point recorded images. Consequently, there can be no physical offset on the grating as there is for the point sizes having different rows. The offset must, however, be provided and it is provided by means of circuitry disclosed in copending application Serial No. 696,448, filed simultaneously herewith. Suffice it to say, for the present, that when photographing the smaller point sizes, e.g. 6 point, the first nine pulses generated (one-half the number of units of the typographical em which contains 18 units in the present system) are discarded. The same is true when recording any of the other smaller point sizes, that is, the first nine pulses generated by the grating are discarded. If a system based on a twelve unit em is employed, the first six pulses will be omitted.

It is contemplated that many changes could be made to the preferred embodiment of this invention as above described without departing from the spirit and scope thereof, and therefore it is intended that all matter contained in the above description or shown in the accompanying drawings shall be interpreted as illustrative and not in a limiting sense.

Reference is made to copending application Serial No. 696,446, filed simultaneously herewith in the name of Gorrill, which discloses and claims the grating in which the translucent slits for each series are arranged in two different rows and cooperate with two alternately acting photocells, in the manner and for the purpose hereinabove described. So far as the present invention is concerned, the translucent slits for each series could be arranged in the same row and made to cooperate with a single photocell, as shown and described in the aforementioned application Serial No. 432,757. With such a single photocell, each pulse thereof could be transmitted directly to the conductor 103 in Fig. 12. Gorrill's circuitry has been shown herein as representing the best mode of practicing the present invention.

What is claimed is:

1. In a phototypographical machine in which there is a relative line composing movement between the sensitized surface on which the text matter is photographed and the means for projecting character images, each of said character images having a characteristic width which is a multiple of a unit space, said unit space being a predetermined part of a given typographical em, and in which said line composing movement is measured to control the photographing of successive character images, the combination of an opaque grating partaking of the line composing movement and having a series of successively acting translucent slits spaced apart at a distance proportional to the aforesaid unit space, a photocell unit pulsed by a light beam passing through said slits during the line composing movement of the grating, an electrical circuit energized by the pulsing of the photocell unit and controlling the photographic action in accordance with unit variations in set widths of the character images successively composed, and electrical means for transmitting to the electrical circuit each successive pulse of the photocell unit or every other pulse thereof, as required, whereby character images of a given point size or character images of twice that point size may be composed, said electrical pulse transmitting means including two selective circuits, one responding to successive pulses from the photocell unit, and the other responding to every other pulse from said unit.

2. The combination according to claim 1, wherein the translucent slits in the grating are spaced apart in accordance with the unit space of a given point size, whereby the character images of that point size or of twice that point size may be composed under control of the same series of slits.

3. The combination according to claim 1, wherein the electrical circuit which controls the photographic action includes an electric counter in which the unit set width value of each character image composed is previously registered.

4. The combination according to claim 1, wherein the grating is provided with a plurality of series of translucent slits, the spacing of said slits varying in the different series to accord with typographical ems based on different point sizes.

5. The combination according to claim 1 including means for activating one or the other of the two selective circuits according to which one of the two point sizes of characters is being composed.

6. In a phototypographical machine in which there is a relative line composing movement between the sensitized surface on which the text matter is photographed and the means for projecting character images, each of said character images having a characteristic width which is a multiple of a unit space, said unit space being a predetermined part of a given typographical em, and in which said line composing movement is measured to control the photographing of successive character images, the combination of an electrical circuit for controlling the photographic action in accordance with unit variations in set widths of the character images successively composed, a photocell unit for pulsing said circuit during the line composing movement for each unit space of a typographical em of some given point size, and electrical means for transmitting to the electrical circuit each successive pulse of the photocell unit or every other pulse thereof, as required, whereby character images of a given point size or character images of twice that point size may be composed, said electrical pulse transmitting means including two selective circuits, one responding to successive pulses from the photocell unit, and the other responding to every other pulse from said unit.

References Cited in the file of this patent

UNITED STATES PATENTS

| | | |
|---|---|---|
| 2,446,968 | Turrettini | Mar. 4, 1947 |
| 2,714,842 | Hooven | Aug. 9, 1955 |